United States Patent
Lim et al.

(10) Patent No.: US 8,390,728 B2
(45) Date of Patent: Mar. 5, 2013

(54) IMAGE PROCESSING APPARATUS AND METHOD

(75) Inventors: Jae-guyn Lim, Yongin-si (KR);
Hyun-wook Ok, Seoul (KR);
Byung-kwan Park, Seoul (KR);
Seong-deok Lee, Suwon-si (KR);
Joo-young Kang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 477 days.

(21) Appl. No.: 12/576,264

(22) Filed: Oct. 9, 2009

(65) Prior Publication Data

US 2010/0091133 A1    Apr. 15, 2010

(30) Foreign Application Priority Data

Oct. 10, 2008   (KR) .................. 10-2008-0099611
Dec. 3, 2008    (KR) .................. 10-2008-0121864

(51) Int. Cl.
*H04N 5/225*   (2006.01)
*G06K 9/32*    (2006.01)

(52) U.S. Cl. .................... 348/344; 382/299

(58) Field of Classification Search ............... 348/222.1, 348/223.1, 340–344; 382/266, 279, 298, 382/299
See application file for complete search history.

(56) References Cited

U.S. PATENT DOCUMENTS

| | | | |
|---|---|---|---|
| 6,097,394 A | | 8/2000 | Levoy et al. |
| 7,986,343 B2* | | 7/2011 | Kumagai et al. ......... 348/208.13 |
| 2006/0159369 A1* | | 7/2006 | Young ............................. 382/299 |
| 2006/0279585 A1* | | 12/2006 | Milanfar et al. .............. 345/694 |
| 2007/0019887 A1* | | 1/2007 | Nestares et al. ............... 382/299 |
| 2007/0070226 A1* | | 3/2007 | Matusik et al. ................ 348/275 |
| 2007/0230944 A1 | | 10/2007 | Georgiev |
| 2008/0131019 A1 | | 6/2008 | Ng |
| 2008/0165270 A1 | | 7/2008 | Watanabe et al. |
| 2008/0187305 A1 | | 8/2008 | Raskar et al. |

FOREIGN PATENT DOCUMENTS

| | | |
|---|---|---|
| EP | 1 956 410 A2 | 8/2008 |
| JP | 2008-167154 | 7/2008 |
| KR | 1020030020357 | 3/2003 |
| KR | 1020060115961 | 11/2006 |
| KR | 1020070106613 | 11/2007 |
| KR | 1020080049121 | 6/2008 |

OTHER PUBLICATIONS

European Search Report issued on Jan. 8, 2010, in corresponding European Application No. 09 17 1559 (9 pages).

(Continued)

*Primary Examiner* — Trung Diep

(74) *Attorney, Agent, or Firm* — NSIP Law

(57) ABSTRACT

An image processing apparatus may include an image frame determiner to determine one standard image frame and at least one reference image frame using light field data about a scene, a point spread function determiner to determine a point spread function based on sub-pixel displacement between the standard image frame and the at least one reference image frame, an image interpolator to interpolate the standard image frame into a high-resolution standard image frame having a higher resolution than the standard image frame, and an image restorer to restore a high-resolution image by updating the high-resolution standard image frame using the generated high-resolution standard image frame, the point spread function, and the at least one reference image frame.

19 Claims, 11 Drawing Sheets

OTHER PUBLICATIONS

Ren Ng, et al. "Light Field Photography with a Hand-held Plenoptic Camera," Dec. 31, 2005, pp. 1-11, *Stanford University Computer Science Tech Report CTSR 2005-02*, ACM, New York, NY, retrieved from Internet: http://graphics.stanford.edu/papers/lfcamera/lfcamera-150dpi.pdf.

Simon Baker, et al. "Limits on Super-Resolution and How to Break Them," *IEEE Transactions on Pattern Analysis and Machine Intelligence*, Sep. 2002, pp. 1167-1183, vol. 24 Issue 9, IEEE Computer Society.

Edward H. Adelson, et al. "Single Lens Stereo with a Plenoptic Camera," *IEEE Transactions on Pattern Analysis and Machine Intelligence*. Feb. 1992, pp. 99-106, vol. 14 Issue 2, IEEE Computer Society.

Euncheol Choi, et al. "Super-Resolution Approach to Ovecome Physical Limitations of Imaging Sensors: An Overview," *International Journal of Imaging Systems and Technology*, Aug. 12, 2004, pp. 36-46, vol. 14 Issue 2, Wiley Periodicals, Inc., USA.

Sung Cheol Park, et al. "Super-resolution Image Reconstruction: A Technical Overview," *Signal Processing Magazine*, May 2003, pp. 21-36, vol. 20 Issue 3, IEEE Signal Processing Society.

Yosuke Bando, et al. "Towards Digital Refocusing from a Single Photograph," *Proceedings of the 15th Pacific Conference on Computer Graphics and Applications*, 2007, pp. 363-372, IEEE Computer Society, Washington, DC, USA.

Dissertation in summons to attend oral proceedings issued on Mar. 4, 2012, in counterpart European Patent Application No. 09171559.9 (in English, 6 pages).

Bishop, Tom. E., et al. "Light Field Superresolution," 2009 IEEE International Conference on Computational Photography (ICCP 2009), IEEE, U.S., Apr. 16, 2009, pp. 1-9, XP03170269, ISBN: 978-1-4244-4534-9.

Bishop, Tom E. et al., "Light Field Superresolution," 2009 IEEE International Conference on Computational Photography, 2009, pp. 1-10, IEEE.

Chan, Wai-San et al., "Super-resolution reconstruction in a computational compound-eye imaging system," Multidimensional Systems and Signal Processing, Feb. 23, 2007, vol. 18, No. 2-3, pp. 83-101, Springer Science + Business Media, LLC.

Extended European Search report issued Nov. 30, 2011 in counterpart International Application No. EP 11182727.5-2202 (8 Pages).

* cited by examiner

IMAGE PROCESSING APPARATUS AND METHOD

CROSS-REFERENCE TO RELATED APPLICATION

This application claims the benefit under 35 U.S.C. §119 (a) of Korean Patent Application No. 10-2008-0099611, filed Oct. 10, 2008, and No. 10-2008-0121864, filed Dec. 3, 2008, in the Korean Intellectual Property Office, and the entire the disclosure of each Application is incorporated herein by reference.

BACKGROUND

1. Field

The following description relates to a photography. More particularly, this description relates to an apparatus and method to process an image using light field data.

2. Description of the Related Art

Currently, photography systems generally use one photograph operation that enable only one image to be viewed. However, research has been conducted on a plenoptic camera having a focus recombination function. The plenoptic camera, also referred to as a light field camera, captures 4-dimensional light field information of a scene using a microlens array (e.g., a lenticular lens array) or a light coded mask. Such a plenoptic camera may provide a user with various functions, such as re-focusing an image to change a focal plane and view variation to enable a scene to be viewed from several angles, after one photograph operation.

In addition, high-resolution images are needed in many areas, for example, surveillance cameras, computed tomography (CT) images for precision diagnosis, computer vision for pattern recognition, geological survey satellite images, etc. In order to obtain high-resolution images, research has been conducted to provide methods of reconstructing a high-resolution image from a sequence of low-resolution images using signal processing technology.

SUMMARY

In a general aspect, an image processing apparatus includes an image frame determiner to determine one standard image frame and at least one reference image frame using light field data corresponding to a scene, a point spread function determiner to determine a point spread function based on sub-pixel displacement between the standard image frame and the at least one reference image frame, an image interpolator to interpolate the standard image frame to generate a high-resolution standard image frame having a higher resolution than the standard image frame, and an image restorer to restore a high-resolution image by updating the high-resolution standard image frame using the generated high-resolution standard image frame, the point spread function, and the at least one reference image frame.

The sub-pixel displacement may be a location difference between at least one light field data constituting the standard image frame and light field data of each reference image frame respectively corresponding to the at least one light field data.

The image frame determiner may determine one image frame from among image frames generated using the light field data and shown from at least one angle as the standard image frame, and may determine at least one image frame from among the generated image frames shown from at least one angle, excluding the image frame determined as the standard image frame, as the at least one reference image frame.

The image frame determiner may determine an image frame generated using a total value of light field data acquired per sub-aperture from the light field data as the standard image frame and may determine at least one image frame generated using the light field data per sub-aperture used in generating the standard image frame as the at least one reference image frame.

The point spread function determiner may determine a 2-dimensional Gaussian function for each sub-pixel displacement based on the sub-pixel displacement between the standard image frame and each reference image frame as the point spread function.

The image interpolator may interpolate using bilinear interpolation or bicubic interpolation.

The image restorer may include a residual value generator to generate a residual value using the generated high-resolution standard image frame, one of the at least one reference image frame, and the point spread function based on the one reference image frame and the standard image frame, and an image updater to update the high-resolution standard image frame using the residual value.

The residual value may be a value of the one reference image frame minus the convolution of the high-resolution standard image frame with the point spread function.

When the high-resolution standard image frame is updated, the residual value generator may generate the residual value using the updated high-resolution standard image frame, another one of the at least one reference image frame, and the point spread function based on the another one of the at least one reference image frame and the standard image frame.

The residual value may be a value of the another one of the reference image frame minus the convolution of the updated high-resolution standard image frame with the point spread function.

The image processing apparatus may further include a light field data capturer, where the light field data capturer includes a first optical unit to form an image of an object, a photosensor array to capture light rays, and a second optical unit located between a main lens and the photosensor array to separate light rays based on direction of the light rays and to direct the light rays toward the photosensor array.

In another general aspect, an image processing method by an image processing apparatus may include determining by an image frame determiner one standard image frame and at least one reference image frame using light field data corresponding to a scene, determining by a point spread function determiner a point spread function based on sub-pixel displacement between the standard image frame and the at least one reference image frame, interpolating by an image interpolator the standard image frame to generate a high-resolution standard image frame having a higher resolution than the standard image frame, and restoring by an image restorer a high-resolution image by updating the high-resolution standard image frame using the generated high-resolution standard image frame, the point spread function, and the at least one reference image frame.

The sub-pixel displacement may be a location difference between at least one light field data constituting the standard image frame and light field data of each reference image frame respectively corresponding to the at least one light field data.

Determining one standard image frame and at least one reference image frame using light field data may include determining by the image frame determiner one image frame among image frames generated using the light field data and shown from at least one angle as the standard image frame and determining by the image frame determiner at least one image frame among the generated image frames shown from at least one angle, excluding the image frame determined as the standard image frame, as the at least one reference image frame.

Determining one standard image frame and at least one reference image frame using light field data may include determining by the image frame determiner an image frame generated using a total value of light field data acquired per sub-aperture from the light field data as the standard image frame and determining by the image frame determiner at least one image frame generated using the light field data per sub-aperture used in generating the standard image frame as the at least one reference image frame.

Determining a point spread function may include determining by the point spread function determiner a 2-dimensional Gaussian function for each sub-pixel displacement based on the sub-pixel displacement between the standard image frame and each reference image frame as the point spread function.

Interpolating the standard image frame into a high-resolution standard image frame may include interpolating by the image interpolator using bilinear interpolation or bicubic interpolation.

Restoring a high-resolution image may include generating by the image restorer a residual value using the generated high-resolution standard image frame, one of the reference image frames, and the point spread function based on the one reference image frame and the standard image frame and updating by an image updater the high-resolution standard image frame using the residual value.

The residual value may be a value of the one reference image frame minus the convolution of the high-resolution standard image frame with the point spread function.

Restoring a high-resolution image may include generating when the high-resolution standard image frame is updated the residual value using the updated high-resolution standard image frame, another one of the at least one reference image frame, and the point spread function based on the another one of the at least one reference image frame and the standard image frame.

Other features and aspects will be apparent from the following description, drawings, and claims.

BRIEF DESCRIPTION OF THE DRAWINGS

Throughout the drawings and the detailed description, unless otherwise described, the same drawing reference numerals will be understood to refer to the same elements, features, and structures. The relative size and depiction of these elements may be exaggerated for clarity and convenience.

DETAILED DESCRIPTION

The following detailed description is provided to assist the reader in gaining a comprehensive understanding of the media, methods, apparatuses, and systems described herein. Accordingly various changes, modifications, and equivalents of the media, methods, apparatuses, and systems described herein will be suggested to those of ordinary skill in the art. Also, descriptions of well-known functions and structures may be omitted for increased clarity and conciseness.

Figure 1:
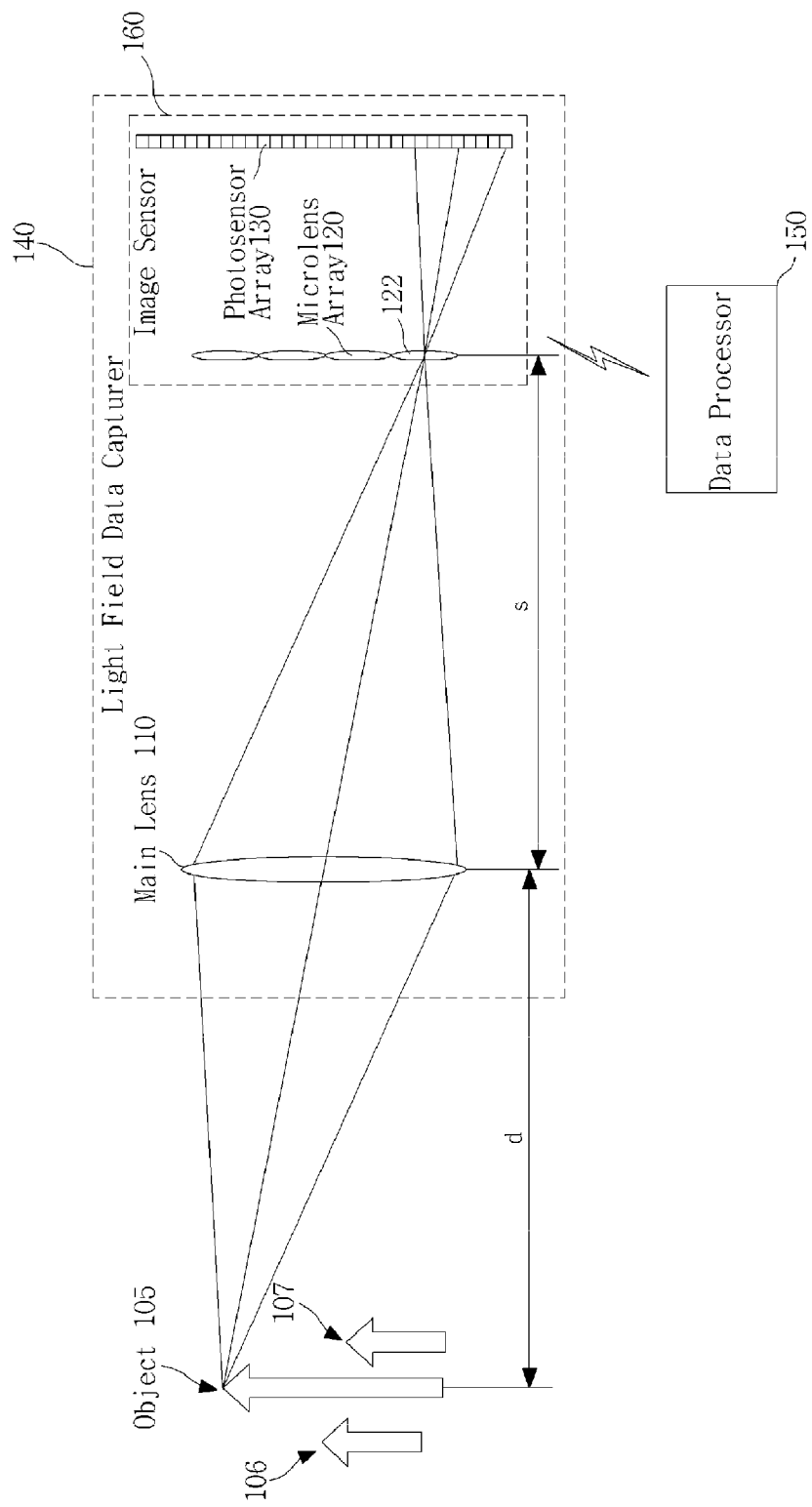
FIG. 1 is a diagram showing an exemplary image processing apparatus.

FIG. 1 illustrates an exemplary image processing apparatus. The image processing apparatus includes a light field data capturer 140 and a data processor 150 to process captured light field data. The light field data capturer 140 may include a main lens 110 to form an image of an object, a photosensor array 130, and a microlens array 120. The microlens array 120 separates light rays passing through the main lens 110 based on a direction of the light rays and directs the light rays toward the photosensor array 130. In this case, the microlens array 120 and the photosensor array 130 may be implemented using an image sensor 160. Using such an image processing apparatus, a refocused image or images seen from several angles can be acquired (i.e., an image view may be adjusted).

Light rays from a single point on an object 105 in an imaged scene can arrive at a single convergence point in a focal plane of the microlens array 120. A microlens 122 at this convergence point separates the light rays based on the light direction and generates a focused image of an aperture of the main lens 110 on a photosensor corresponding to the microlens.

The photosensor array 130 detects light incident thereon and generates an output processed by using at least one of several components. The output light data is sent to the data processor 150 together with location information about each photosensor providing data, for example, when an image of a scene including objects 105, 106, and 107 is generated.

The data processor 150 may be implemented using, for example, a computer including a common component (e.g., one chip) or different components, or some other processing circuit. In one example, one part of the data processor 150 may be implemented by the light field data capturer 140 while another part may be implemented by an external computer.

The data processor 150 is configured to process image data and to calculate an image of a scene including the objects 105, 106, and 107.

The data processor 150 selectively refocuses and/or corrects data when generating an image that can be refocused/corrected using detected light or features of detected light together with a known direction of light arriving at the microlens array 120 (e.g., calculated using a known location of each photosensor).

The microlens array 120 illustrated in FIG. 1 may include several distinguishable microlenses, but an array is generally made of a great number (e.g., several thousand or several tens of thousands) of microlenses. The microlens array 120 also may be implemented in other forms, such as an optical encoding mask that replaces the microlens array 120, as long as the replacement separates light rays passing through the main lens 110 based on their direction. The main lens 110 and the microlens array 120 may be implemented using various lenses and/or microlens arrays that are currently usable or are developed in the future.

The photosensor array 130 ordinarily includes several photosensors for each microlens in the microlens array 120. The size of each pixel (i.e., the pitch) of the photosensor array 130 is relatively smaller than the pitch of the microlens array 120. Also, microlenses in the microlens array 120 and photosensors in the photosensor array 130 may be positioned such that light propagating through each microlens toward the photosensor array does not overlap with light propagating through adjacent microlenses.

The main lens 110 has the ability to move horizontally along the optical axis in order to focus on an object of interest at a desired depth "d" as shown between the main lens 110 and the example photographing object 105 as illustrated in FIG. 1. Accordingly, the main lens 110 can refocus light beams at a desired location based on obtained light field data.

For example, light rays from a single point of the object 105 may arrive at a single convergence point on the microlens 122 in the focal plane of the microlens array 120. The microlens 122 separates these light rays based on their direction and generates a focused image corresponding to the aperture of the main lens on a pixel set in the pixel array below the microlens and light field data of the focused image.

Considering a 2-plane light field "L" inside the image processing apparatus 100, light field data L(u,v,s,t) represents light propagating along a ray that intersects the main lens 110 at location (u,v) and intersects the plane of the microlens array 120 at location (s,t). For example, the light field data L(u,v,s,t) represents an intensity value of a light beam which passes through the location (u,v) of a sub-aperture of the main lens 110 and passes through the location (s,t) of a microlens. Here, sub-aperture refers to a number of directional resolution of the main lens 110. For example, when the sub-aperture number is 196, each microlens array 120 corresponds to 196 pixels.

Each photosensor in the photosensor array 130 may be configured to provide a value representing a light ray set directed toward the photosensor through the main lens 110 and the microlens array 120. That is, each photosensor may generate an output in response to light incident on the photosensor, and the position of each photosensor with respect to the microsensor array 120 may be used to provide directional information about the incident light.

The data processor 150 may generate a refocusing image using the light field data (i.e., L(u,v,s,t)). At this time, the data processor 150 may determine the direction of light on each photosensor using the position of each photosensor with respect to the microlens. Also, the data processor 150 may determine depth of field of an object within a scene over which the detected light beam spreads out and may use the depth of field and direction of detected light to calculate a composite image focused in a different focal plane.

The image formed below the specific microlens 122 in the microlens array 120 indicates system directional resolution regarding the position in the photographic plane. The main lens 110 may be effectively at an infinite optical distance from the microlens, and the photosensor array 130 may be located in one plane at the focal depth of the microlens in order to focus the microlens. A separation distance "s" between the main lens 110 and the microlens array 120 may be selected within the depth of field of the microlens so as to achieve a sharp image.

The aperture size of the main lens 110 and the aperture size of the microlens in the microlens array 120 (e.g., the effective size of an opening in the lens) may be selected to be suitable for a specific application of the image processing apparatus 100. The aperture size of the main lens 110 and the aperture size of the microlens can be easily determined by matching f-numbers (i.e., the focal ratio: ratio of lens's effective focal length to aperture) of the microlens and the main lens.

Figure 2:
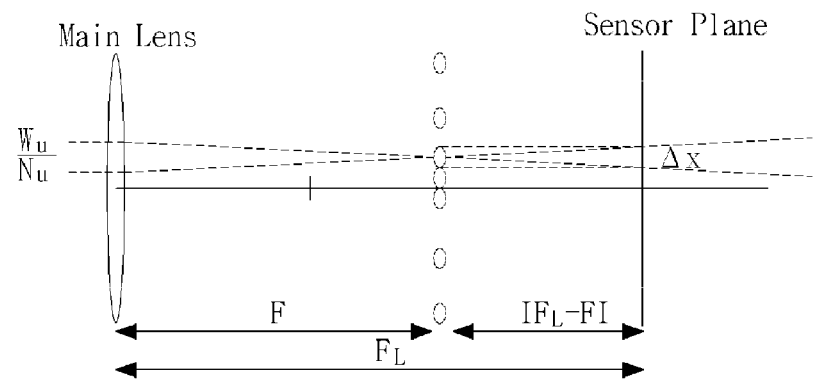
FIG. 2 is a diagram showing relationships between an exemplary plenoptic camera's directional resolution, spatial resolution, and photosensor pixel size.

FIG. 2 shows the relationship between an exemplary plenoptic camera's directional resolution, spatial resolution, and photosensor pixel size. The plenoptic camera's spatial sampling and directional sampling rates may be represented by $\Delta x$ and $\Delta u$, respectively. The camera sensor's width is may be represented by $W_x$, and the width of the lens aperture is may be represented by $W_u$. Thus, a photosensor's spatial resolution may be expressed as $N_x = W_x/\Delta x$, and the light field camera's directional resolution may be expressed as $N_u = W_u/\Delta u$.

In order to perform refocusing at a desired distance, it is known that the following equation should to be satisfied:

$$\Delta x \cdot N_u \geq \frac{|F - F_L|}{F_L} \cdot W_u \quad \text{(Equation 1)}$$

Where F represents a focal distance of the main lens and $F_L$ represents a focal distance from the object according to a desired range of refocusing. That is, F and $F_L$ represent a range of focal depth that enables precise refocusing.

For example, when $W_u = 20$ mm, $F = 80$ mm, and the distance of an object for refocusing is up to 1 m, substitution into Equation 1 above yields $\Delta x \cdot N_u \geq 1.59$ mm. In a sensor containing 4145×4145 pixels, when a target spatial resolution of an image is 1400×1400, about 3 (4150/1400) pixels are capable of expressing directional resolution.

However, when the refocusing range is set at 1 m to ∞, and the pitch of one pixel of the sensor is 9 μm, the required directional resolution $N_u$ should be at least 58 (1.59 mm/(3 pixels×9 μm)). That is, when the refocusing range is 1 m to ∞, it is impossible to obtain a spatial resolution of 1400×1400. Accordingly, it is necessary to change the refocusing range or the target spatial resolution.

The Table below lists examples of permissible $\Delta x$ and needed $N_u$ necessary to express directional resolution with respect to target spatial resolution under the above suppositions.

TABLE 1

|  | Target Spatial Resolution | | | |
| --- | --- | --- | --- | --- |
|  | 1400 × 1400 | 700 × 700 | 350 × 350 | 300 × 300 |
| Permissible Δx | 21 μm (3 pixels) | 54 μm (6 pixels) | 108 μm (12 pixels) | 126 μm (14 pixels) |
| Needed $N_u$ | 58 | 30 | 15 | 13 |

Referring to Table 1, when the refocusing range is set at 1 m to ∞ and the spatial resolution is set to 300×300, a spatial resolution of 13×13 is possible and the above refocusing range can be secured. That is, when sensor size is fixed, it is difficult to secure a desired spatial resolution; in order to obtain the desired spatial resolution, a larger sensor is required.

In order to acquire a high-resolution image, light field data is set as spatially sub-sampled data and defined as low-resolution data for improving resolution. Also, registration and reconstruction of the low-resolution data can be performed by defining a sub-pixel displacement of the location of a sub-sampled low-resolution image with respect to the location of a standard low-resolution image among the low-resolution data. Accordingly, spatial resolution may be improved by signal processing the generated light field data.

Figure 3A:
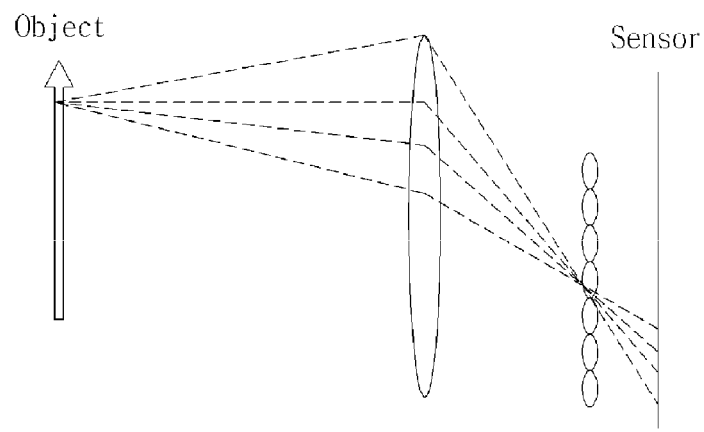
FIG. 3A is a diagram showing an exemplary high-resolution image reconstruction.
Figure 3B:
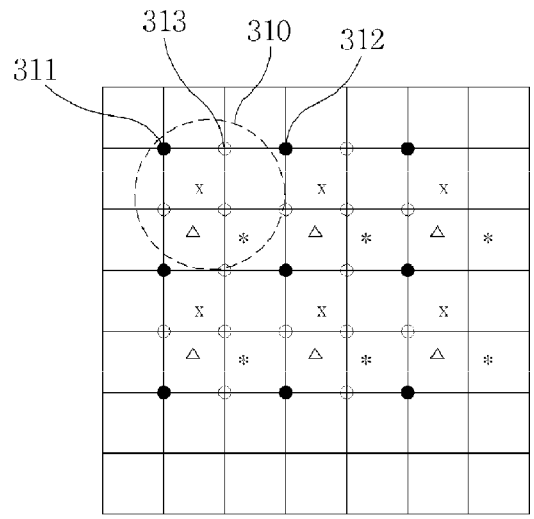
FIG. 3B is another diagram showing an exemplary high-resolution image reconstruction.
Figure 3C:
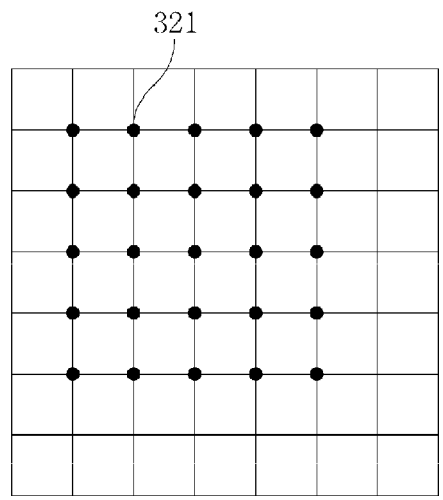
FIG. 3C is another diagram showing an exemplary high-resolution image reconstruction.

FIGS. 3A, 3B, and 3C show an exemplary high-resolution image reconstruction.

As shown in FIG. 3A, light field data is captured. As described above, when an image is acquired using the light field data, a plurality of low-resolution images or sub-sampled images with reduced spatial resolution compared to an ordinary photographic device using the same photosensor array, are acquired. One image among the plurality of low-resolution images may be determined as a standard image frame, and the sub-sampled low-resolution image frames, excluding the standard image frame, may be selected and determined as at least one reference image frame.

FIG. 3B illustrates the result of registering light field data on a high-resolution (HR) grid.

FIG. 3B shows registration of light field data constituting a standard image frame and a reference image frame selected on a HR grid. In FIG. 3B, "•," "x," "Δ," and "*" represent optical field data about one point on an object, each representing light field data that passed through a different location of the main lens. When an image frame formed using light field data that is indicated by "•," and includes points 311 and 312, is the standard image frame, it may be registered on the HR grid as shown in FIG. 3B.

A high-resolution image frame is reconstructed as shown in FIG. 3C. The resolution of the standard image frame can be increased by interpolating values between light field data constituting the standard image frame using light field data about one point on the object. For example, a value 321 on the HR grid between light field data 311 and light field data 312 may be interpolated using light field data included in an area 310 on the HR grid of FIG. 3B.

Figure 4:
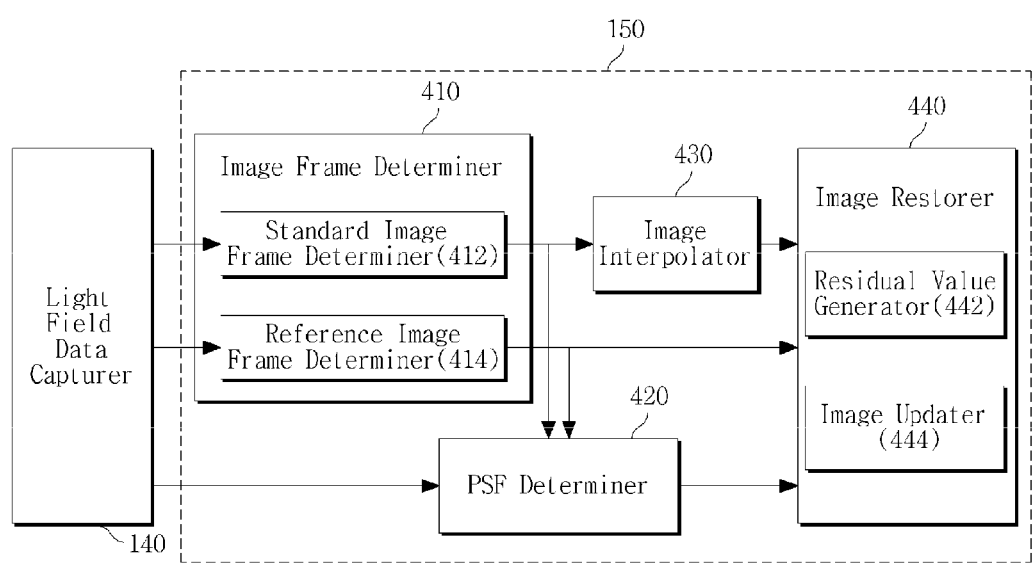
FIG. 4 is a block diagram showing an exemplary image processing apparatus.

FIG. 4 illustrates an exemplary image processing apparatus. Referring to FIG. 4, an exemplary image processing apparatus includes a light field data capturer 140 and a data processor 150. The light field data capturer 140 may be configured as described above with reference to FIG. 1. The light field data capturer 140 may include a first optical unit to form an image of an object; a photosensor array capturing light rays; and a second optical unit located between the main lens and the photosensor array to separate light rays based on direction of the light rays and to direct the light rays toward the photosensor array.

The data processor 150 may include an image frame determiner 410, a point spread function determiner 420, an image interpolator 430, and an image restorer 440. The image frame determiner 410 determines one standard image frame and at least one reference image frame using light field data about a scene and may include a standard image frame determiner 412 and a reference image frame determiner 414.

The standard image frame determiner 412 may determine one image frame from among image frames generated using light field data, and shown from at least one angle, as the standard image frame. The reference image frame determiner 414 may determine at least one generated image frame shown from at least one angle, excluding the image frame determined as the standard image frame, as at least one reference image frame.

The standard image frame determiner 412 may determine an image frame generated using a total value of light field data, acquired per sub-aperture from light field data, as the standard image frame. The reference image frame determiner 414 may determine at least one image frame generated using the light field data per sub-aperture, used in generating the standard image frame, as the at least one reference image frame.

The point spread function ("PSF") determiner 420 may determine a point spread function based on sub-pixel displacement between the standard image frame and each reference image frame. The sub-pixel displacement may be a location difference between at least one light field data constituting the standard image frame and light field data of a reference image frame respectively corresponding to the at least one light field data. The sub-pixel displacement may be a value set according to transmission location on the main lens of light field data about each point of the object or according to the structure of the light field data capturer 140, and the sub-pixel displacement may be a value that varies according to distance from the object.

The PSF determiner 420 may determine each 2-dimensional Gaussian function based on the sub-pixel displacement between the standard image frame and each reference image frame, as the point spread function. The PSF is determined differently for each reference image compared to the standard image and is determined by the sub-pixel displacement corresponding to each predetermined reference image regardless of update of the standard image frame.

The image interpolator 430 interpolates the standard image frame into a high-resolution standard image frame having a higher resolution than the standard image frame. The image interpolator 430 may interpolate using a bilinear interpolation method or a bicubic interpolation method.

The image restorer 440 may restore a high-resolution image by updating the high-resolution standard image frame using the generated high-resolution image frame, the point spread function, and at least one reference image frame. The image restorer 440 may perform several high-resolution image processing methods for generating the high-resolution image frame using a plurality of low-resolution image frames. In one example, the image restorer 440 may include a residual value generator 442 and an image updater 444.

The residual value generator 442 generates a residual value using the generated high-resolution standard image frame, one of the reference image frames, and the point spread function based on the one reference image frame and the standard image frame. Here, the residual value may be a value of the one reference image frame (i.e., observed image) minus the convolution of the high-resolution standard image frame with the point spread function (i.e., estimated image). The image updater 444 updates the high-resolution standard image frame using the residual value (i.e., the image obtained by subtracting the estimated image from the observed image).

Also, when the high-resolution standard image frame is updated, the residual value generator 442 may generate the residual value using the updated high-resolution standard image frame, another one of the reference image frames, and the point spread function based on the other one of the reference image frames and the standard image frame. Here, the residual value may be a value of the other reference image frame minus the convolution of the updated high-resolution standard image frame with the point spread function. The image updater 444 updates the high-resolution standard image frame using the residual value.

These operations may be repeated until the operations have been performed on every one of the plurality of reference images. For example, when there are 10 reference image frames, the above-described updating operation is performed 10 times. The method of updating the high-resolution standard image frame using the residual value generated as described above may employ various high-resolution image restoration techniques, such as projection onto convex sets ("POCS").

The high-resolution standard image frame updating operation may be repeated until a desired quality of the restored high-resolution image is reached. For example, after completing update operations by using 10 reference image frames, an operation of updating a generated high-resolution image using the 10 reference image frames and the PSF may be repeated until the residual value falls below a specific critical value.

Figure 5A:
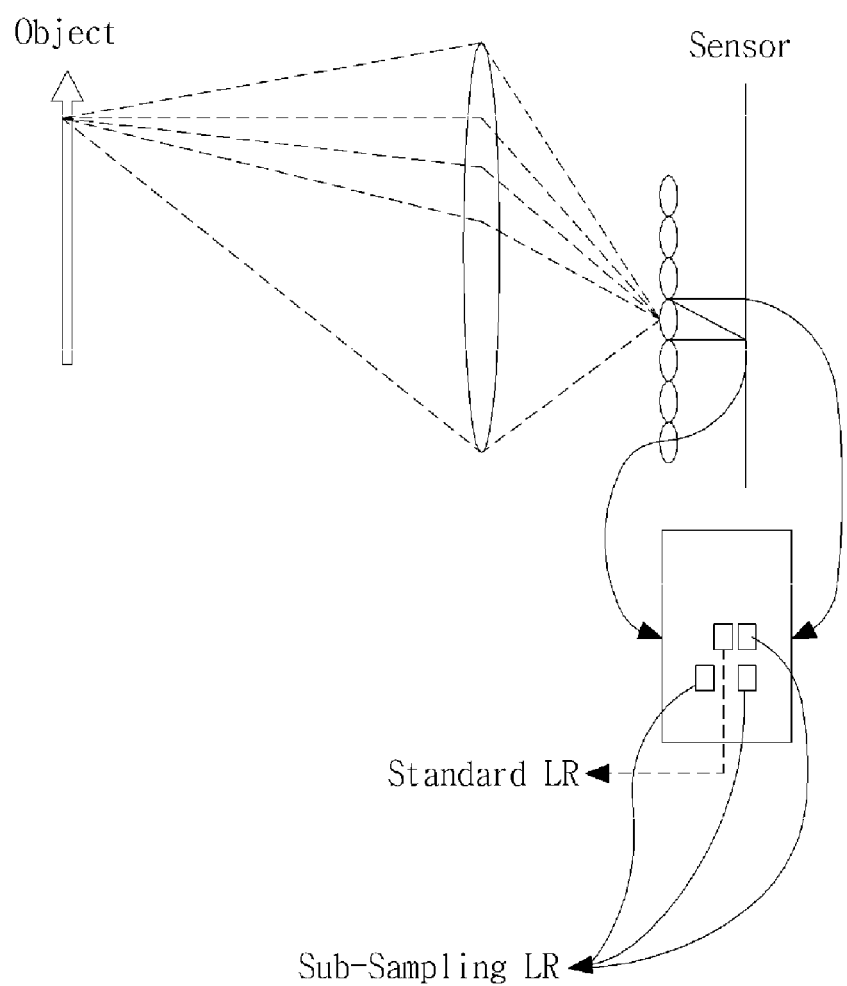
FIG. 5A is a diagram showing an exemplary technique of selecting a standard image frame and a reference image frame.
Figure 5B:
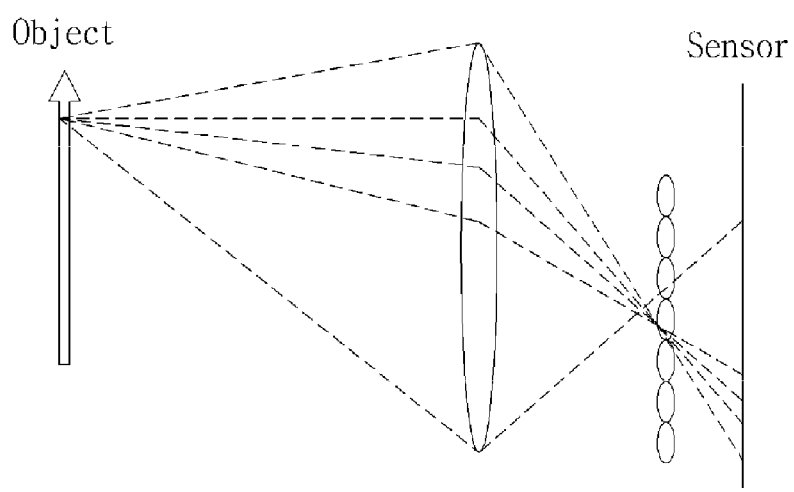
FIG. 5B is another diagram showing an exemplary technique of selecting a standard image frame and a reference image frame.

FIGS. 5A and 5B illustrate an exemplary technique of selecting a standard image frame and reference image frames. FIG. 5A shows an example of the light field data capturer in the case of capturing light field data to enable precise refocusing, and FIG. 5B shows an example of the light field data capturer of capturing light field data that do not enable precise refocusing.

When precise refocusing at directional resolution with respect to one point on an object is possible as shown in FIG. 5A, the image frame determiner 410 may determine one image frame, from among image frames that are generated using light field data and viewed from at least one angle, as the standard image frame. The image frame determiner 140 also may determine at least one of the generated image frames viewed from at least one angle, excluding the image frame determined as the standard image frame, as at least one reference image frame.

When precise refocusing is impossible as shown in FIG. 5B, the image frame determiner 410 may determine an image frame generated using a total value of light field data acquired per sub-aperture from the light field data as the standard image frame. The image frame determiner 410 also may determine at least one image frame formed using the light field data per sub-aperture used in generating the standard image frame as at least one reference image frame. Here, the at least one image frame generated using the light field data per sub-aperture used in generating the standard image frame may correspond to image frames including the standard image frame and the at least one reference image frame described with reference to FIG. 5A.

Figure 6A:
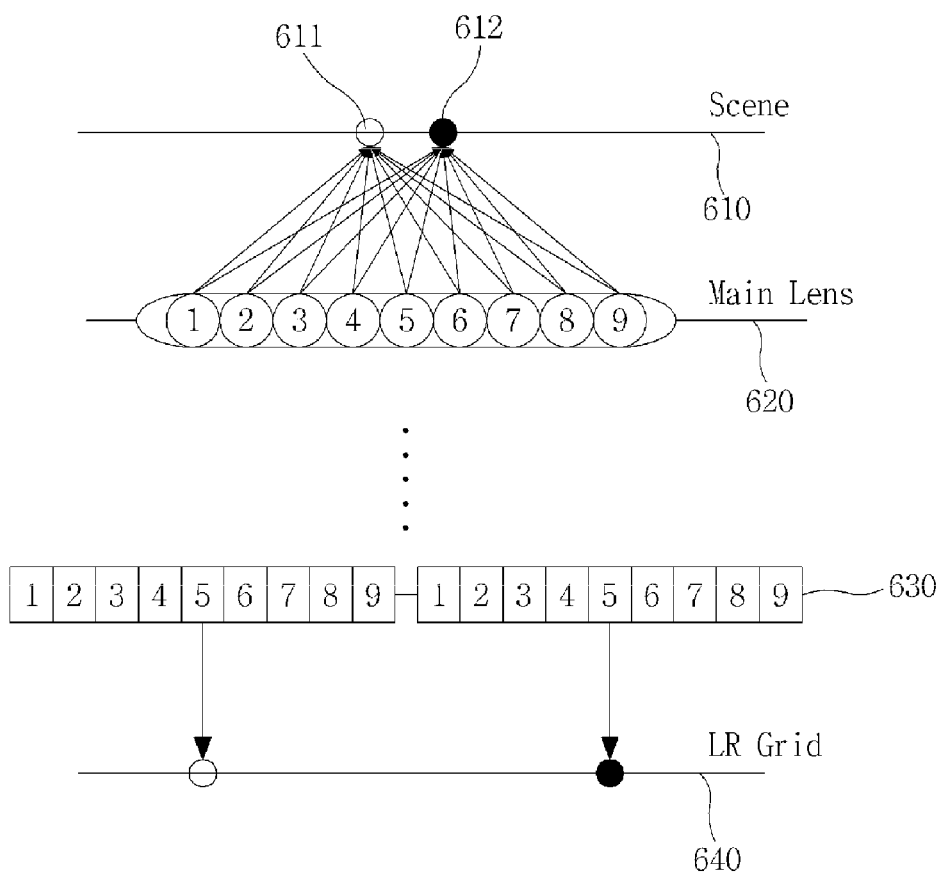
FIG. 6A is a diagram showing an exemplary sub-pixel displacement compared to a standard image frame based on light field.
Figure 6B:
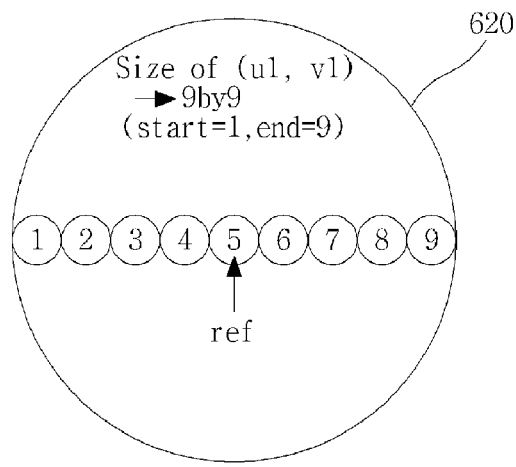
FIG. 6B is another diagram showing an exemplary sub-pixel displacement compared to a standard image frame based on light field.
Figure 6C:
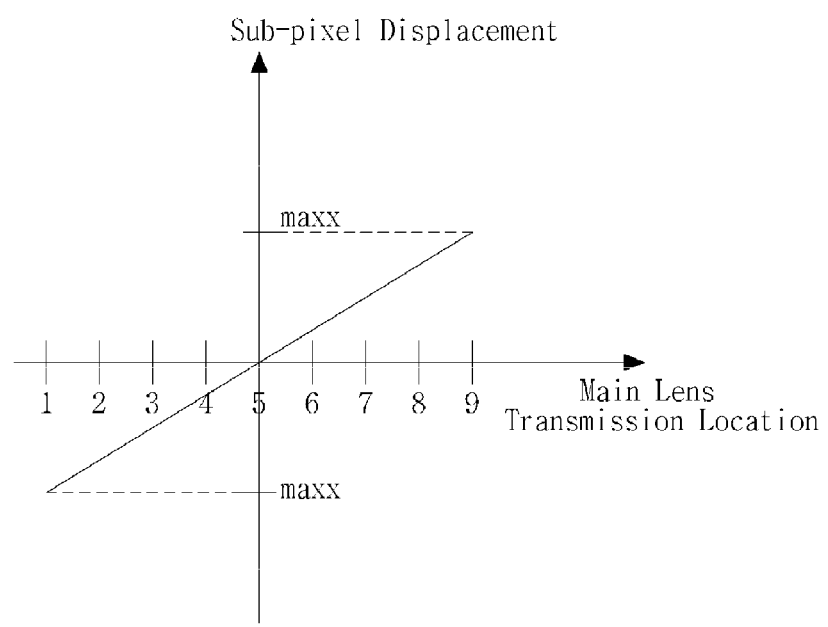
FIG. 6C is another diagram showing an exemplary sub-pixel displacement compared to a standard image frame based on light field data.

FIGS. 6A to 6C illustrate sub-pixel displacement compared to a standard image frame based on light field data.

FIG. 6A shows a light signal from objects 611 and 612 of a scene 610 passing through a main lens 620 having 9 sub-apertures and a light signal passing through each sub-aperture of the main lens 620 incident on a light pixel corresponding to the number of sub-apertures in a light sensor 630. Reference numeral 640 represents sensed data defined in position on a low-resolution ("LR") grid. In FIG. 6A, a sensed value sensed by the 5$^{th}$ light sensor (e.g., intensity) is shown on the LR grid, but intensities sensed in pixels of the remaining light sensors also are defined on the LR grid.

FIG. 6B shows that the sensed LR data (e.g., light field data) is data that has passed through sub-apertures of the main lens 620. In FIGS. 6A and 6B, for ease of description, the arrangement of sub-apertures of the main lens 620 and the arrangement of pixels of the light sensor 630 are in a line, but the sub-aperture arrangement and the pixel arrangement may have several different forms.

FIG. 6C shows an example of sub-pixel displacement of reference image frames with respect to a standard image frame. As shown in FIG. 6C, data passing through sub-apertures of the main lens may define an amount of sub-pixel displacement with respect to the standard image frame. In FIG. 6C, it is assumed that an image frame made up of light field data passing through a 5$^{th}$ sub-aperture is determined as the standard image frame, an arrangement difference between light field data passing through a 1$^{st}$ sub-aperture and light field data passing through a 9$^{th}$ sub-aperture is 1 pixel, and a sub-pixel displacement is proportional to a main lens transmission location, as shown in FIG. 6C. In this case, when maxx is defined as 0.5, an image frame consisting of light field data passing through the 6$^{th}$ sub-aperture is determined to have a pixel shift of 0.125 with respect to the standard image frame.

Figure 7:
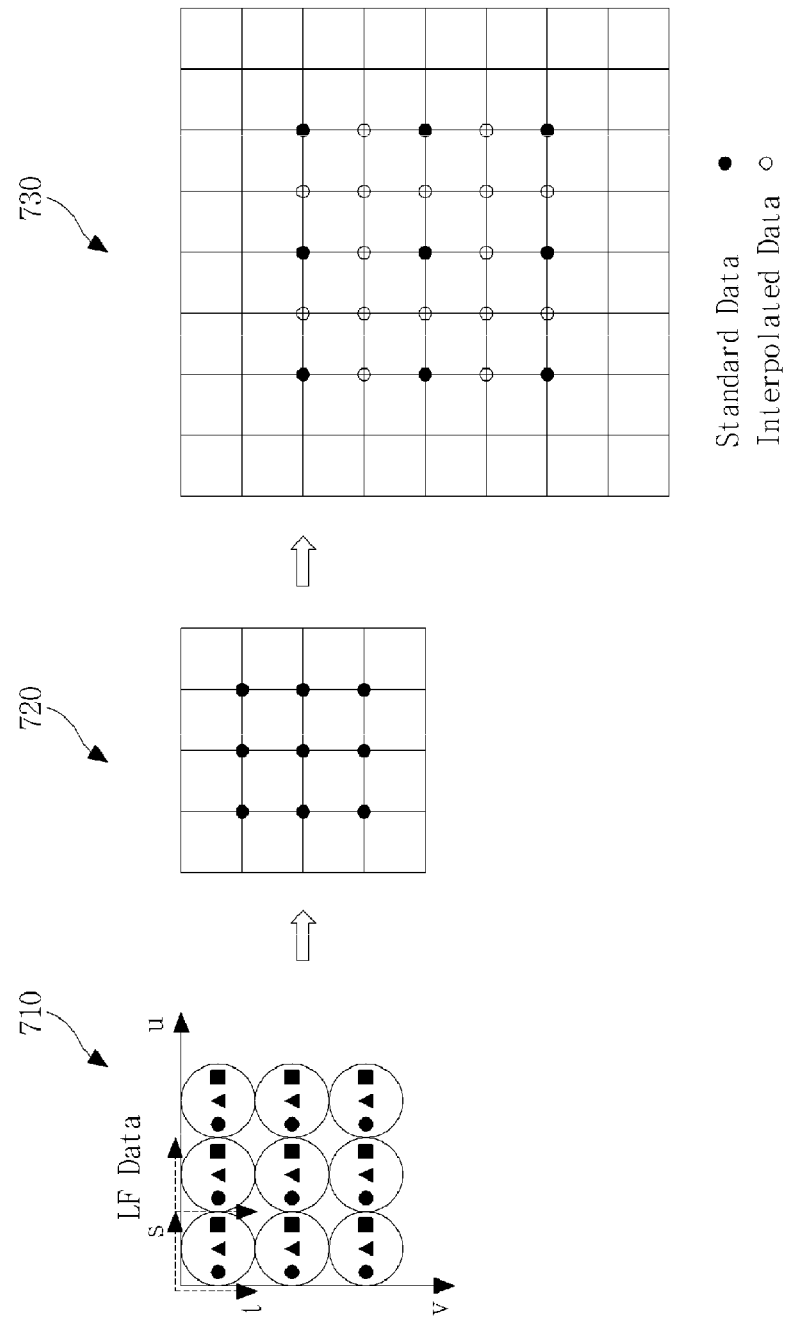
FIG. 7 is a diagram showing generation of an exemplary high-resolution image frame based on a standard image.

FIG. 7 illustrates generation of an exemplary high-resolution image frame based on light field data.

In order to form the standard image frame into the high-resolution image, a size for improved resolution is determined, and the standard image frame is enlarged to the determined size by signal processing, for example, by an interpolation method, such as bilinear interpolation or bicubic interpolation.

Reference numeral 710 denotes sensed light field data, reference numeral 720 denotes data of a standard image frame displayed on an LR grid, and reference numeral 730 denotes an example of high-resolution processed data of the standard image frame displayed on an HR grid. "•" denotes data of the standard image frame, and "○" denotes data interpolated using data of the original standard image frame.

Figure 8:
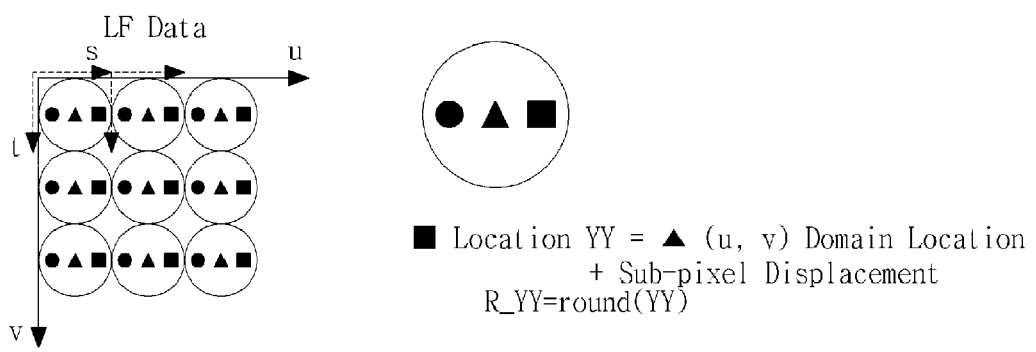
FIG. 8 is a diagram showing one example of an exemplary calculation of a point spread function (PSF) based on a standard image frame.

FIG. 8 shows one example of the calculation of a PSF based on a standard image frame. Light field data shown on the left side of FIG. 8 illustrates a brief form of light field data acquired for explaining an exemplary method of calculating a PSF. "•," "▲," and "■" represent light field data about one point on an object.

The PSF may be expressed as:

$$PSF(\sigma) = \exp\left(-\frac{(YY - R\_YY)^2 + (XX - R\_XX)^2}{2 \cdot \sigma^2}\right) \quad \text{(Equation 2)}$$

For example, ■ position XX represents a total value of sub-pixel displacement defined in an x-axis direction, at a point location in a standard ▲ (u, v) domain. R_XX denotes the center location of the peak of a Gaussian function of the PSF as round(XX). Also, ■ position YY represents a total value of sub-pixel displacement defined in a y-axis direction, at a point location in a standard ▲ (u, v) domain. R_YY denotes the center location of the peak of a Gaussian function of the PSF as round(YY). That is, the PSF may be defined based on light field location. The Gaussian envelope of the PSF changes according to the degree of sub-pixel displacement.

Figure 9:
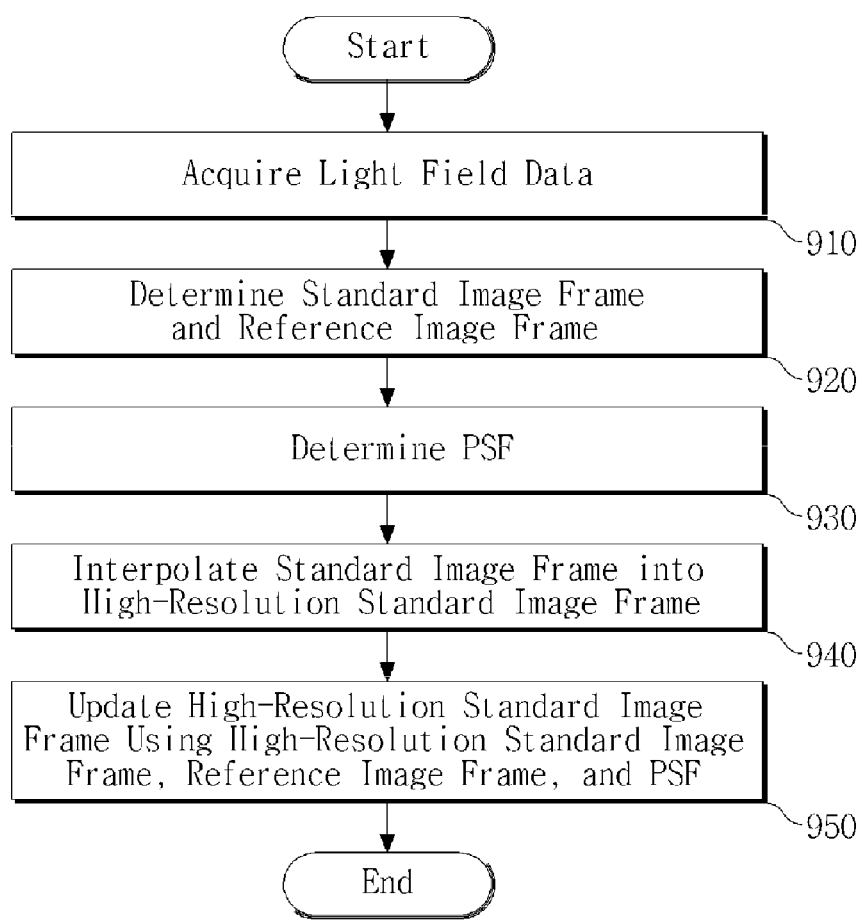
FIG. 9 is a flowchart showing an exemplary method of generating a high-resolution image using light field data.

FIG. 9 illustrates an exemplary method of generating a high-resolution image using light field data.

Light field data about a scene is captured (910). A standard image frame and at least one reference image frame are determined using the captured light field data (920). A point spread function is determined based on sub-pixel displacement between the standard image frame and the at least one reference image frame (930).

The standard image frame is interpolated into a high-resolution standard image frame having higher resolution than the standard image frame (940). A high-resolution image is restored by updating the high-resolution standard image frame using the generated high-resolution image frame, the point spread function, and the at least one reference image frame (950).

The operation of restoring the high-resolution image may be performed repeatedly until it has been performed for every reference image. A POCS method may be used to generate sub-pixel unit high-resolution images.

The above-described methods may be recorded, stored, or fixed in one or more computer-readable media that includes program instructions to be implemented by a computer to cause a processor to execute or perform the program instructions. The media also may include, independently or in combination with the program, instructions, data files, data structures, and the like. Examples of computer-readable media may include magnetic media, such as hard disks, floppy disks, and magnetic tape; optical media such as CD ROM disks and DVD; magneto-optical media, such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices and units may be configured to act as one or more software modules in order to perform the operations and/or methods described above in combination with a processor, computer, and/or computing device.

A number of exemplary embodiments have been described above. Nevertheless, it is understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An image processing apparatus, comprising:
    an image frame determiner configured to determine one standard image frame and at least one reference image frame using light field data corresponding to a scene;
    a point spread function determiner configured to determine a point spread function based on sub-pixel displacement between the standard image frame and the at least one reference image frame;
    an image interpolator configured to interpolate the standard image frame to generate a high-resolution standard image frame having a higher resolution than the standard image frame; and
    an image restorer configured to restore a high-resolution image by updating the high-resolution standard image frame using the generated high-resolution standard image frame, the point spread function, and the at least one reference image frame, wherein the image restorer comprises
        a residual value generator configured to generate a residual value using the generated high-resolution standard image frame, one of the at least one reference image frame, and the point spread function based on the one reference image frame and the standard image frame, and
        an image updater configured to update the high-resolution standard image frame using the residual value.

2. The apparatus of claim 1, wherein the sub-pixel displacement is a location difference between at least one light field data constituting the standard image frame and light field data of each reference image frame respectively corresponding to the at least one light field data.

3. The apparatus of claim 1, wherein the image frame determiner determines one image frame from among image frames generated using the light field data and shown from at least one angle as the standard image frame, and determines at least one image frame from among the generated image frames shown from at least one angle, excluding the image frame determined as the standard image frame, as the at least one reference image frame.

4. The apparatus of claim 1, wherein the image frame determiner determines an image frame generated using a total value of light field data acquired per sub-aperture from the light field data as the standard image frame and determines at least one image frame generated using the light field data per sub-aperture used in generating the standard image frame as the at least one reference image frame.

5. The apparatus of claim 1, wherein the point spread function determiner determines a 2-dimensional Gaussian function for each sub-pixel displacement based on the sub-pixel displacement between the standard image frame and each reference image frame as the point spread function.

6. The apparatus of claim 1, wherein the image interpolator interpolates using bilinear interpolation or bicubic interpolation.

7. The apparatus of claim 1, wherein the residual value is a value of the one reference image frame minus the convolution of the high-resolution standard image frame with the point spread function.

8. The apparatus of claim 1, wherein in response to the high-resolution standard image frame being updated, the residual value generator generates the residual value using the updated high-resolution standard image frame, another one of the at least one reference image frame, and the point spread function based on the another one of the at least one reference image frame and the standard image frame.

9. The apparatus of claim 8, wherein the residual value is a value of the another one of the reference image frame minus the convolution of the updated high-resolution standard image frame with the point spread function.

10. The apparatus of claim 1, further comprising a light field data capturer,
    wherein the light field data capturer includes:
        a first optical unit configured to form an image of an object;
        a photosensor array configured to capture light rays; and
        a second optical unit located between a main lens and the photosensor array configured to separate light rays based on direction of the light rays and configured to direct the light rays toward the photosensor array.

11. The apparatus of claim 1, wherein the one standard image frame and the at least one reference image frame are different from each other.

12. An image processing method by an image processing apparatus, comprising:
    determining by an image frame determiner one standard image frame and at least one reference image frame using light field data corresponding to a scene;
    determining by a point spread function determiner a point spread function based on sub-pixel displacement between the standard image frame and the at least one reference image frame;

interpolating by an image interpolator the standard image frame to generate a high-resolution standard image frame having a higher resolution than the standard image frame; and restoring by an image restorer a high-resolution image by updating the high-resolution standard image frame using the generated high-resolution standard image frame, the point spread function, and the at least one reference image frame, wherein the restoring of the high-resolution image comprises generating by the image restorer a residual value using the generated high-resolution standard image frame, one of the reference image frames, and the point spread function based on the one reference image frame and the standard image frame, and updating by an image updater the high-resolution standard image frame using the residual value.

13. The method of claim 12, wherein the sub-pixel displacement is a location difference between at least one light field data constituting the standard image frame and light field data of each reference image frame respectively corresponding to the at least one light field data.

14. The method of claim 12, wherein determining one standard image frame and at least one reference image frame using light field data comprises:

determining by the image frame determiner one image frame among image frames generated using the light field data and shown from at least one angle as the standard image frame; and determining by the image frame determiner at least one image frame among the generated image frames shown from at least one angle, excluding the image frame determined as the standard image frame, as the at least one reference image frame.

15. The method of claim 12, wherein determining one standard image frame and at least one reference image frame using light field data comprises:

determining by the image frame determiner an image frame generated using a total value of light field data acquired per sub-aperture from the light field data as the standard image frame; and determining by the image frame determiner at least one image frame generated using the light field data per sub-aperture used in generating the standard image frame as the at least one reference image frame.

16. The method of claim 12, wherein determining a point spread function comprises:

determining by the point spread function determiner a 2-dimensional Gaussian function for each sub-pixel displacement based on the sub-pixel displacement between the standard image frame and each reference image frame as the point spread function.

17. The method of claim 12, wherein interpolating the standard image frame into a high-resolution standard image frame comprises:

interpolating by the image interpolator using bilinear interpolation or bicubic interpolation.

18. The method of claim 12, wherein the residual value is a value of the one reference image frame minus the convolution of the high-resolution standard image frame with the point spread function.

19. The method of claim 12, wherein restoring a high-resolution image comprises:

generating in response to the high-resolution standard image frame being updated the residual value using the updated high-resolution standard image frame, another one of the at least one reference image frame, and the point spread function based on the another one of the at least one reference image frame and the standard image frame.

* * * * *